United States Patent Office 3,058,076
Patented Oct. 9, 1962

3,058,076
ELECTRICAL MEASURING DEVICE FOR A PRECISION BALANCE
Walter Hasler, Stafa, and Walter Friedrich Birrer, Zurich, Switzerland, assignors to Erhard Mettler, Zollikon, Zurich, Switzerland
Filed Sept. 11, 1959, Ser. No. 839,434
Claims priority, application Switzerland Apr. 4, 1959
3 Claims. (Cl. 336—30)

This invention relates to an electrical measuring device for a precision balance and more particularly to an electrical measuring device in which the movable measuring part of a precision balance comprises a lug of material which is an electrical conductor but not ferro-magnetic and in which two fixedly-mounted coils are provided, each coil having a ferro-magnetic pole piece, an air gap being formed between one end of each of the pole pieces into which air gap said lug can penetrate without contact in order to vary the magnetic coupling between the coils in a manner dependent upon the deflection of the measuring part. The coupling variations can be measured by electrical means in any desired manner. A simple method is to connect the two coils in an alternating-current circuit which works with alternating current at a constant or variable frequency. In this case, either the amplitude variations or the frequency variations may serve as gauge for the deflection of said lug.

Such measuring devices are not, however, free of reaction and it has been found that, particularly with sensitive balances, such reactions represent a source of errors which are very difficult to detect but which cannot be ignored. Objects of the invention are to considerably reduce the said reactions by means of an electrical measuring device of the kind outlined and in which said pole pieces are connected by one or more short-circuit sections of ferro-magnetic material to close the magnetic flux path between the pole pieces in the region outside the air gap, one or each pole piece being substantially surrounded at its end adjacent to the air gap by a screen of material which is an electrical conductor but not ferro-magnetic. These screens are preferably slit at one side in a direction pointing towards said short-circuit member and the screens extend on both sides of the lug substantially parallel to the direction of movement of the latter.

Figure 1:
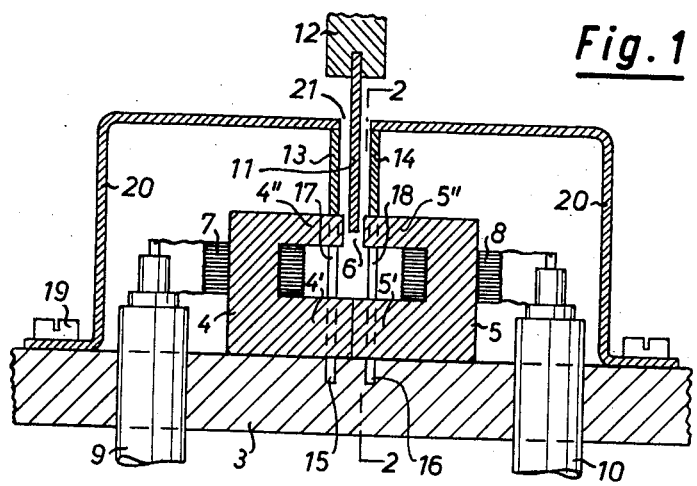
Figure 2:
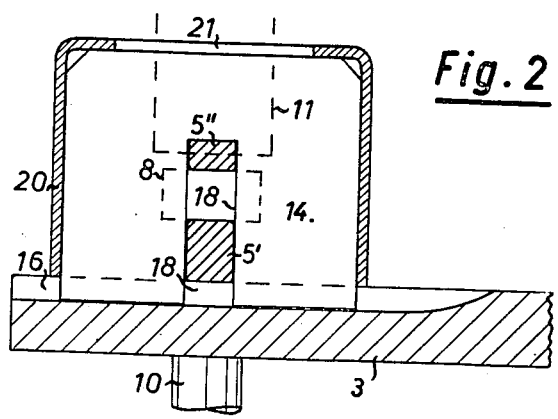

These and other objects and the advantages of the invention will best be understood from the following dedescription of a specific embodiment when read in connection with the accompanying drawing in which:

FIG. 1 shows a vertical section through the measuring device, the part of the base of the balance which carries it and its measuring part being merely indicated, while the balance itself is not shown in detail for reasons of clarity, and FIG. 2 shows a further vertical section through the measuring device at the point 2—2 of FIG. 1.

The measuring device is mounted on a support part 3 which consists of brass or another material which is an electrical conductor but not ferro-magnetic, and which is either itself a part of the base of the balance or may be secured to said base. Secured to the part 3 are two substantially U-shaped yokes 4 and 5, each of the same dimensions, the end faces of the longer and thicker arms 4' and 5' of which lie flat against one another. The shorter and thinner arms 4" and 5" form pole pieces, the facing ends of which bound an air gap 6. The two U-shaped yokes preferably consist of a powdered ferro-magnetic material which may be processed to form rigid bodies. The yokes 4 and 5 may be stuck to the part 3, for example with synthetic resin. Mounted on each of the yokes 4 and 5 is a coil 7 and 8 respectively, which are preferably dimensioned for high frequency and the connections of which are each connected to a coaxial cable 9 and 10 respectively, passing through the part 3. A lug or plate 11 of copper, aluminum or another material which is an electrical conductor but non-ferro-magnetic, is secured to the measuring part 12 of the balance and penetrates into the air gap 6. The measuring part 12 of the balance may be an arm of the beam of the balance or, in a spring balance, a part of the pan carrier supporting the scale pan. In the illustration in FIGS. 1 and 2 it is assumed that the part 12 can move up and down at least substantially in the vertical direction according to the weight of the article to be weighed, in such manner that the lug 11 assumes different positions of height between the pole pieces 4" and 5", without contact. Furthermore, each of the two pole pieces 4" and 5" is surrounded at the end adjacent the air gap 6 by a screen 13 or 14 respectively, which extends parallel to the lug 11 and in its direction of movement. These screens consist of copper or aluminum sheets which are held in slots 15 and 16 provided in the part 3. The screens 13 and 14 are slit on one side at the side adjacent to the part 3 and the slits 17 and 18 in question are the same width throughout as the arms 4', 4" and 5', 5" of the U-shaped yokes 4 and 5. The ends of the U-shaped yokes 4 and 5 project side by side through these slits 17 and 18; the faces of the pole pieces 4" and 5" bounding the air gap 6 should project not at all or only insignificantly beyond the screens 13 and 14, as can be seen in FIG. 1. Finally, a housing 20 which has a slotted passage 21 through which the lug 11 can penetrate with clearance, is secured by means of screws 19 to the part 3. The dimensions of the screens 13 and 14 are such that they bear with their edge against the inner wall of the housing 20 (FIG. 2). The housing likewise preferably consists of sheet copper or aluminum.

The device described permits the coupling between the coils 7 and 8 to be varied within wide limits depending on the height of the lug 11. If the lower edge of the lug 11 runs substantially in alignment with the upper edge of the pole pieces 4" and 5", the coupling will be substantially at a maximum. On the other hand, the coupling between the coils 7 and 8 will be almost at the minimum when the lower edge of the lug 11 is in line with the lower edge of the pole pieces 4" and 5". By coupling is understood to mean that which results with electro-magnetic alternating fields because the screens 13 and 14 are only sufficiently effective for alternating fields. In the region outside the air gap 6, the magnetic flux of the alternating field is closed through the arms 4' and 5' which act as short-circuit members. On the other hand, the screens 13 and 14 prevent an extension of the electro-magnetic alternating field in the region outside the slits 17 and 18, so that the electro-magnetic coupling of the coils 7 and 8 is determined primarily by the effective cross-section of the air gap 6. The sensitivity of the arrangement, that is to say the variation in the coupling between the coils 7 and 8 in relation to variations in the depth of penetration of the lug 11, is thus comparatively great and within a wide range there is a linear relationship.

The measurement of the coupling variations between the coils 7 and 8 is preferably effected with a high frequency of a few megacycles. For this purpose, the coil 7 may be connected through the cable 9 to a high-frequency generator which is capable of delivering a power of a few tenths of a watt at a frequency which is at least substantially constant. The coil 8 may be connected through the cable 10 to a vacuum-tube voltmeter including a rectifier circuit. The arrangement is preferably such that the high-frequency current flowing through the primary coil 7 has a constant amplitude. In these circumstances, the high-frequency A.C. voltage at the coil 8 is a gauge, as regards its amplitude, for the depth of penetration of the lug 11, so that the ammeter of the vacuum-tube voltmeter can be calibrated in units of weight. With a power of 0.1 watt high-frequency in the primary coil 7, a mechanical reaction of at most $50.10^{-6}$ grams acting on the lug was found. If the screens 13 and 14 are omitted, not only is the sensitivity reduced quite considerably but also the reaction acting on the lug 11 increases to about twenty times said amount, that is to say about $1000.10^{-6}$ grams and so already reaches the order of magnitude of a milligram.

Instead of using the coils 7 and 8 as a leakage-reactance transformer as described, they may be connected in series in the same or opposite sense and the variations in the resulting total inductance used as a gauge for the depth of penetration of the lug 11. The series-connected coils 7 and 8 may constitute the frequency-determining section of an oscillating circuit of a self-excited high-frequency generator so that this frequency represents the gauge of the particular position of the lug 11. The details of the construction of the electrical part of the measuring device are not of decisive importance and modifications may be used other than those described above. A particular advantage of the measuring device described is the fact that comparatively high electric powers can be controlled with only slight reaction on the measuring part of the balance.

The invention is not limited to the particular embodiments herein shown and described and modifications can be made without departing from the principle and gist of the invention and within the essential features of the invention as set forth in the claims annexed hereto.

We claim:

1. The invention which comprises in combination a precision balance having stationary and movable elements, and electrical means for measuring the extent of movement of said balance movable element comprising a stationary support part, a pair of identical U-shaped ferromagnetic pole pieces secured to said support part and arranged with their open ends facing each other, the legs of said U-shaped pole pieces being of unequal length, the free extremities of said longer legs being in contiguous engagement with each other and the free extremities of the shorter legs of said U-shaped pole pieces being axially spaced to define an air gap, primary coil means wound upon one of said pole pieces and secondary coil means wound upon the other of said pole pieces, an electrically-conductive non-ferromagnetic plate connected to said balance movable member for movement within said air gap to vary the electromagnetic coupling between said two coil means, said plate being movable in a plane normal to the plane of said pole pieces, stationary first planar screen means surrounding both legs of one of said U-shaped pole pieces and extending on one side of said movable plate in a plane parallel thereto, stationary second planar screen means surrounding both legs of the other of said U-shaped pole pieces and extending on the other side of said movable plate in a plane parallel thereto, each of said planar screen means consisting of an electrically-conductive non-ferromagnetic material and having a slot in the region connecting the two legs of the respective U-shaped pole pieces, and means securing each of said planar screen means to said support part.

2. Apparatus as defined in claim 1 wherein said support part is constituted by electrically-conductive non-ferromagnetic material and wherein the edges of both of said planar screen means extend into and terminate within shallow slots in said support part which constitute the screen securing means.

3. Apparatus as defined in claim 1 wherein each of said planar screen means extends substantially flush with said air gap and surrounds the free extremity of the shorter leg of the respective pole piece.

References Cited in the file of this patent

UNITED STATES PATENTS

| 2,827,604 | Cloud | Mar. 18, 1958 |
| 2,872,649 | Boothe | Feb. 3, 1959 |

OTHER REFERENCES

Ser. No. 299,393, Bergtold (A.P.C.), published May 18, 1943.